(12) United States Patent
Mansson et al.

(10) Patent No.: US 10,828,831 B2
(45) Date of Patent: Nov. 10, 2020

(54) HEAD UNIT AND HEAD SUPPLY UNIT FOR CONTROLLING DISCHARGE OF RAW MATERIAL MADE OF PLASTIC FORMABLE MATERIALS

(71) Applicant: EELCEE LTD., Gunpo-si (KR)

(72) Inventors: Jan-Anders Mansson, Puidoux (CH); Dae Hwa Ko, Gyeonggi-do (KR)

(73) Assignee: EELCEE LTD. (KR)

( * ) Notice: Subject to any disclaimer, the term of this patent is extended or adjusted under 35 U.S.C. 154(b) by 172 days.

(21) Appl. No.: 16/068,723

(22) PCT Filed: Dec. 21, 2016

(86) PCT No.: PCT/KR2016/014970
§ 371 (c)(1),
(2) Date: Jul. 9, 2018

(87) PCT Pub. No.: WO2017/122942
PCT Pub. Date: Jul. 20, 2017

(65) Prior Publication Data
US 2019/0022936 A1 Jan. 24, 2019

(30) Foreign Application Priority Data
Jan. 14, 2016 (KR) .......... 10-2016-0004906

(51) Int. Cl.
*B29C 64/209* (2017.01)
*B33Y 30/00* (2015.01)
(Continued)

(52) U.S. Cl.
CPC ......... *B29C 64/209* (2017.08); *B25J 15/0019* (2013.01); *B25J 19/0029* (2013.01);
(Continued)

(58) Field of Classification Search
CPC ............................ B29C 64/118; B29C 64/209
See application file for complete search history.

(56) References Cited

U.S. PATENT DOCUMENTS 8,236,227 B2 * 8/2012 Batchelder ............ B29C 64/118
264/308
2014/0232035 A1 8/2014 Bheda
(Continued)

FOREIGN PATENT DOCUMENTS

CN 101254652 9/2008
CN 102834248 A 12/2012
(Continued)

OTHER PUBLICATIONS

EPO Search Report dated Apr. 14, 2017, 2 pages.
China Patent Office (CNIPA), Office Action dated Apr. 2, 2020 in related Chinese Appln. No. 201680077946.5, pp. 1-9.

*Primary Examiner* — Timothy Kennedy
(74) *Attorney, Agent, or Firm* — The Belles Group, P.C.

(57) ABSTRACT

Disclosed are a head unit and a head supply unit. The head unit according to the present invention discharges a raw material made of plastic formable materials. The head unit includes: a head pipe which guides the movement of the raw material; a head heater which surrounds the entire or partial head pipe and controls the temperature of the raw material which is moving within the head pipe; and a discharge port which is provided on one end of the heat pipe and discharges the raw material to the outside. The head supply unit according to the present invention includes: an inlet through which a raw material made of plastic formable materials is introduced; an inlet pipe which guides the raw material introduced through the inlet; a head supply heater which controls the temperature of the raw material which passes through the inside of the inlet pipe; and a head fastener which is fastened to a head unit which discharges the raw
(Continued)

material. As a result, the temperature of the raw material which is easily solidified, cured or degraded is controlled, so that the raw material can be smoothly discharged and at various positions and angles. Accordingly, it is possible to manufacture a more complex and sophisticated three-dimensional product.

2 Claims, 9 Drawing Sheets

(51) Int. Cl.
| | |
|---|---|
| *B33Y 40/00* | (2020.01) |
| *B29C 64/106* | (2017.01) |
| *B29C 64/205* | (2017.01) |
| *B25J 19/00* | (2006.01) |
| *B29C 64/241* | (2017.01) |
| *B25J 15/00* | (2006.01) |

(52) U.S. Cl.
CPC .......... *B29C 64/106* (2017.08); *B29C 64/205* (2017.08); *B29C 64/241* (2017.08); *B33Y 30/00* (2014.12); *B33Y 40/00* (2014.12)

(56) References Cited

U.S. PATENT DOCUMENTS

| | | | |
|---|---|---|---|
| 2016/0151833 A1* | 6/2016 | Tsao | B29C 64/118 65/60.1 |
| 2017/0157855 A1* | 6/2017 | Larson | B29C 64/371 |

FOREIGN PATENT DOCUMENTS

| | | |
|---|---|---|
| CN | 107580548 | 1/2018 |
| JP | 06121945 A | 5/1994 |
| JP | 2004358649 A | 12/2004 |
| KR | 20120025801 A | 3/2012 |
| KR | 20150117723 A | 10/2015 |

* cited by examiner

HEAD UNIT AND HEAD SUPPLY UNIT FOR CONTROLLING DISCHARGE OF RAW MATERIAL MADE OF PLASTIC FORMABLE MATERIALS

This application is a National Stage application under 35 U.S.C. § 371 of an International application filed on Dec. 21, 2016 and assigned Application No. PCT/KR2016/014970, and claims the benefit of a Korean patent application filed on Jan. 14, 2016 in the Korean Intellectual Property Office and assigned Serial No. 10-2016-0004906, the entire disclosure of each of which is hereby incorporated by reference.

BACKGROUND

Field

The present invention relates to a head unit and a head supply unit for controlling the discharge of a raw material made of plastic formable materials, and more particularly to a head unit and a head supply unit which control the discharge of the raw material made of plastic formable materials and are capable of smoothly discharging the raw material to the outside while continuously controlling the temperature of the raw material.

Description of Related Art

Recently, a technology for manufacturing an internal reinforcement for reinforcing strength and robustness by using a plastic composite material is being used. Research has been actively devoted to an internal skeleton manufacturing technology such as an additive manufacturing apparatus and internal reinforcement of polymer and composites.

Since the use of the internal skeleton manufacturing technology reduces the amount of the raw material used of a light composite material three-dimensional product and improves the mechanical performance of the light composite material three-dimensional product, the three-dimensional printing or three-dimensional molding becomes popular. In particular, the improvement of the additive manufacturing speed allows the three-dimensional robot technology to function as a part of an automated process.

The additive manufacturing technology has a very high potential value in that it can be used in large variety of industrial fields such as automotive, aircrafts, electronic components, consumer electronics, sporting goods, building materials, etc. However, more research is needed in order to manufacture a sophisticated skeleton structure in a cost efficient manner.

Particularly, the additive manufacturing apparatus which manufactures the internal skeleton uses a thin and continues strand of raw material. The raw material is generally made of a material which is easily solidified, cured or degraded. Therefore, there is a requirement for a technology capable of preventing the raw material from being solidified, cured or degraded until the raw material is discharged to the outside through the inside of the additive manufacturing apparatus.

Also, the additive manufacturing apparatus performs a free trajectory motion (e.g. rotation, rectilinear or curved motion) in order to manufacture shapes having various and complex structures. Here, due to the shape characteristics, there is a problem that the constant tension of the raw material is difficult to maintain while the raw material passes through the additive manufacturing apparatus which is performing extensive articulations.

When the tension of the raw material becomes too high, the additive manufacturing apparatus may be out of order. When the tension of the raw material becomes too low, it is difficult to control the discharge speed and position of the raw material.

Disclosed is a bumper beam having a body inside into which the insert reinforcement has been inserted in the Korean Patent No. 10-1198621 (Title: plastic composite bumper beam for vehicle). However, there is no sufficient description of a system for manufacturing the bumper beam into which the insert reinforcement has been inserted. Moreover, a clue for solving the above-described problems cannot be found

SUMMARY

One embodiment is a head unit discharging a raw material made of plastic formable materials. The head unit includes: a head pipe which guides the movement of the raw material; a head heater which surrounds the entire or partial head pipe and controls the temperature of the raw material which is moving within the head pipe; and a discharge port which is provided on one end of the heat pipe and discharges the raw material to the outside.

Another embodiment is a head supply unit that includes: an inlet through which a raw material made of plastic formable materials is introduced; an inlet pipe which guides the raw material introduced through the inlet; a head supply heater which controls the temperature of the raw material which passes through the inside of the inlet pipe; and a head fastener which is fastened to a head unit which discharges the raw material.

DETAILED DESCRIPTION

Figure 1A:
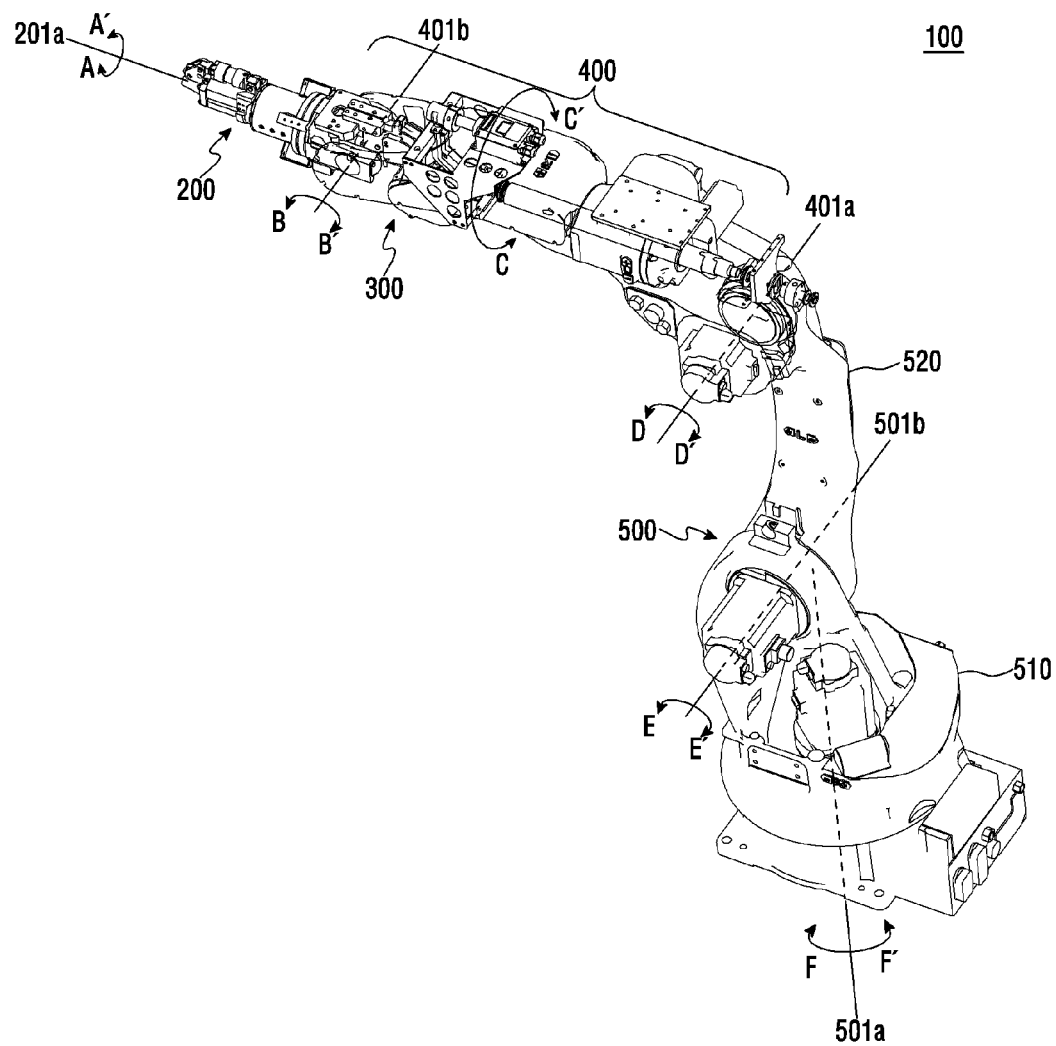
FIG. 1a is a perspective view of a three-dimensional product manufacturing robot 100 according to a first embodiment of the present invention.

Specific embodiments of the present invention will be described in detail with reference to the accompanying drawings. The specific embodiments shown in the accompanying drawings will be described in enough detail that those skilled in the art are able to embody the present invention. Other embodiments other than the specific embodiments are mutually different, but do not have to be mutually exclusive. Additionally, it should be understood that the following detailed description is not intended to be limited.

The detailed descriptions of the specific embodiments shown in the accompanying drawings are intended to be read in connection with the accompanying drawings, which are to be considered part of the entire written description. Any reference to direction or orientation is merely intended for convenience of description and is not intended in any way to limit the scope of the present invention.

Specifically, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation.

Terms such as "attached," "affixed," "connected," "coupled," "interconnected," and similar refer to a relationship wherein structures are attached, connected or fixed to one another either directly or indirectly through intervening structures, as well as both movable or rigid attachments or relationships, unless expressly described otherwise.

Figure 1B:
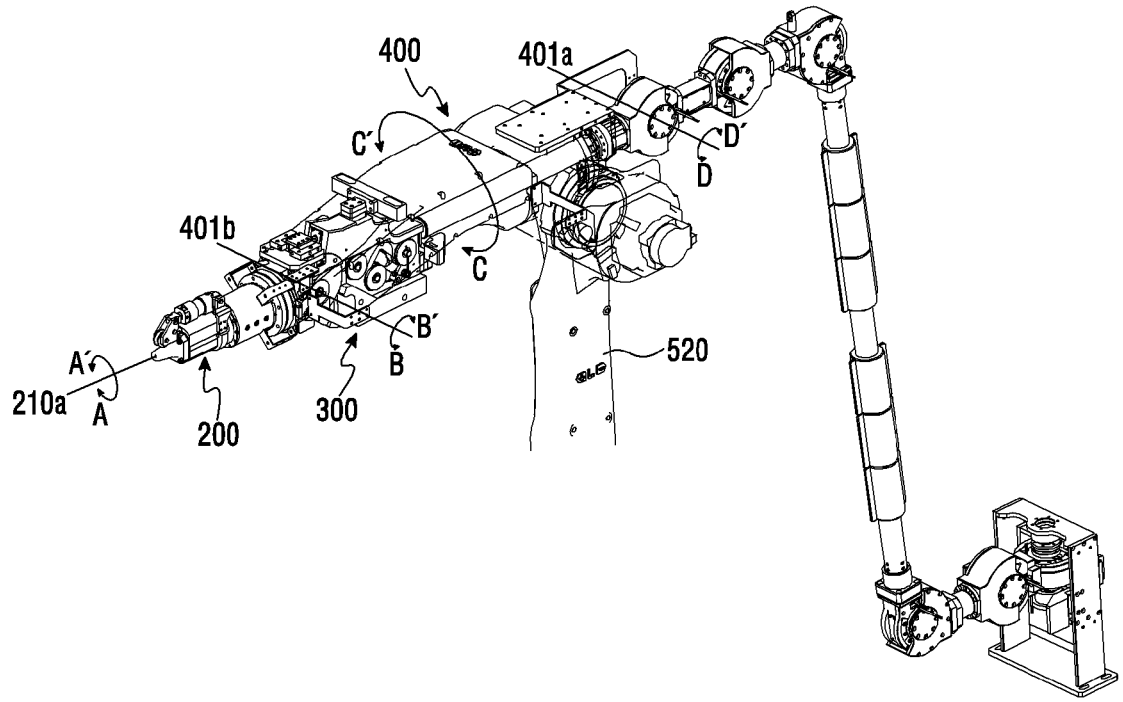
FIG. 1b is a perspective view of a three-dimensional product manufacturing robot 100 according to a second embodiment of the present invention.
Figure 2:
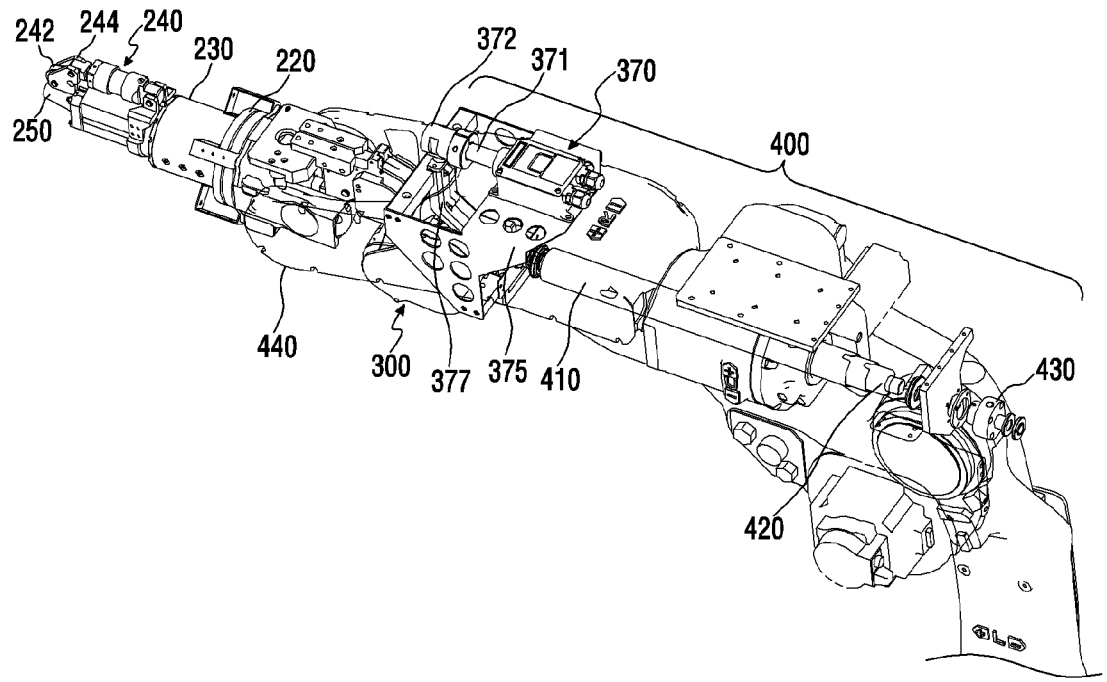
FIG. 2 is a perspective view showing a head unit 200 and a head supply unit 400 which are components of the three-dimensional product manufacturing robot 100 according to the embodiment of the present invention.

FIGS. 1a and 1b are perspective views of a three-dimensional product manufacturing robot 100 according to each embodiment of the present invention. FIG. 2 is a perspective view showing a head unit 200 and a head supply unit 400 which are components of the three-dimensional product manufacturing robot 100 according to the embodiment of the present invention.

First, as shown in FIGS. 1a and 1b, the three-dimensional product manufacturing robot 100 according to each embodiment of the present invention includes the head unit 200, a transformer unit 300, the head supply unit 400, and a body unit 500.

First, the body unit 500 includes a rotation base 510 and a connection arm 520. The rotation base 510 performs a rotational motion (F-F') on a horizontal plane about a rotational axis 501a. One end of the connection arm 520 is connected to the rotation base 510. The other end of the connection arm 520 is connected to the head supply unit 400.

The connection arm 520 and the head supply unit 400 may be connected to each other by means of a member which is rotatable, for example, a pivot hinge, a shaft, etc. Also, the connection arm 520 and the rotation base 510 may be connected to each other by means of a member which is rotatable, for example, a pivot hinge, a shaft, etc. However, there is no limit to this.

More specifically, one end of the connection arm 520 is rotatably connected with respect to the rotation base 510. The connection arm 520 performs a rotational motion (E-E') about a connection axis 501b of an interconnection portion between the connection arm 520 and the rotation base 510.

The other end of the connection arm 520 is rotatably connected with respect to the head supply unit 400. The connection arm 520 is a longitudinal member and adjusts the height of the head supply unit 400 from the horizontal plane.

That is to say, the head supply unit 400 performs a rotational motion (D-D') about a connection axis 401a of an interconnection portion between the connection arm 520 and the head supply unit 400.

The head supply unit 400 performs a rotational motion (C-C') about a longitudinal axis. Here, as the head supply unit 400 rotates, the transformer unit 300 and the head unit 200 which have been connected to the head supply unit 400 rotates in association with the rotation of the head supply unit 400.

Here, a rotation member (not shown) may be included in order to ensure the rotation of the head supply unit 400. The rotation member can be implemented by a variety of known rotation devices.

Also, the head unit 200 is connected with respect to the head supply unit 400. The head unit 200 is connected to a head fastener 440 provided on the head supply unit 400. The head unit 200 performs a rotational motion (B-B') about a connection axis 401b of an interconnection portion between the head unit 200 and a head fastener 440.

The rotational motion (B-B') of the head unit 200 is, as shown in FIG. 1a, controlled by an operation of the transformer unit 300. That is, the head unit 200 is connected to the transformer unit 300, and the head unit 200 and the transformer unit 300 face each other with respect to the connection axis 401b. Here, the head unit 200 and the transformer unit 300 perform the vertical rotational motion (B-B') in an opposite direction to each other (for example, when a portion of the transformer unit 300 descends, the head unit 200 ascends, and when the portion of the transformer unit 300 ascends, the head unit 200 descends).

Unlike this, the rotational motion (B-B') of the head unit 200 can be made when the head unit 200 is, as shown in FIG. 1b, rotatably connected to the transformer unit 300. That is, the head unit 200 may be rotatably connected to an end of the transformer unit 300 with respect to the axis.

The head unit 200 performs a 360 degree rotational motion (A-A') about a longitudinal axis 201a thereof. A wheel assembly enables the head unit 200 to perform a multiple rotation (360°, 720° . . . ). Here, a spacer may be provided on the head unit 200 so as to prevent electric wires included in the head unit 200 from being affected by the rotation of the head unit 200.

As described above, the three-dimensional product manufacturing robot 100 according to the embodiment of the present invention may rotate about multi-axes. It has been described that the three-dimensional product manufacturing robot 100 can rotate about six axes. However, when the three-dimensional product manufacturing robot 100 includes a tiltable tool table robot to which the rotation base 510 is coupled, the robot 100 can rotate about eight axes.

In other words, the rotation that the three-dimensional product manufacturing robot 100 according to the embodiment of the present invention can perform is as follows:

The first axis rotation: the rotation of the head unit 200 about the longitudinal axis 201a (A-A')

The second axis rotation: the rotation of the head unit 200, which is controlled by the transformer unit 300 (B-B')

The third axis rotation: the rotation of the head supply unit 400 about the longitudinal axis thereof The fourth axis rotation: the rotation of the head supply unit 400 about the connection axis 401a between the head supply unit 400 and the connection arm 520 connected to the head supply unit 400 (D-D')

The fifth axis rotation: the rotation of the connection arm 520 about the connection axis 501b of the rotation base 510 connected to the connection arm 520 (E-E')

The sixth axis rotation: the rotation of the rotation base 510 about the rotational axis 501a perpendicular to the horizontal plane (F-F')

The seventh and eighth axis rotations: the rotation of the tool table (not shown) which is coupled to the rotation base 510 and can rotate about two axes As a result, since the operation of the head unit 200 discharging plastic formable materials can be finely controlled, it is possible to manufacture a three-dimensional product having a more complex and sophisticated shape.

Figure 3A:
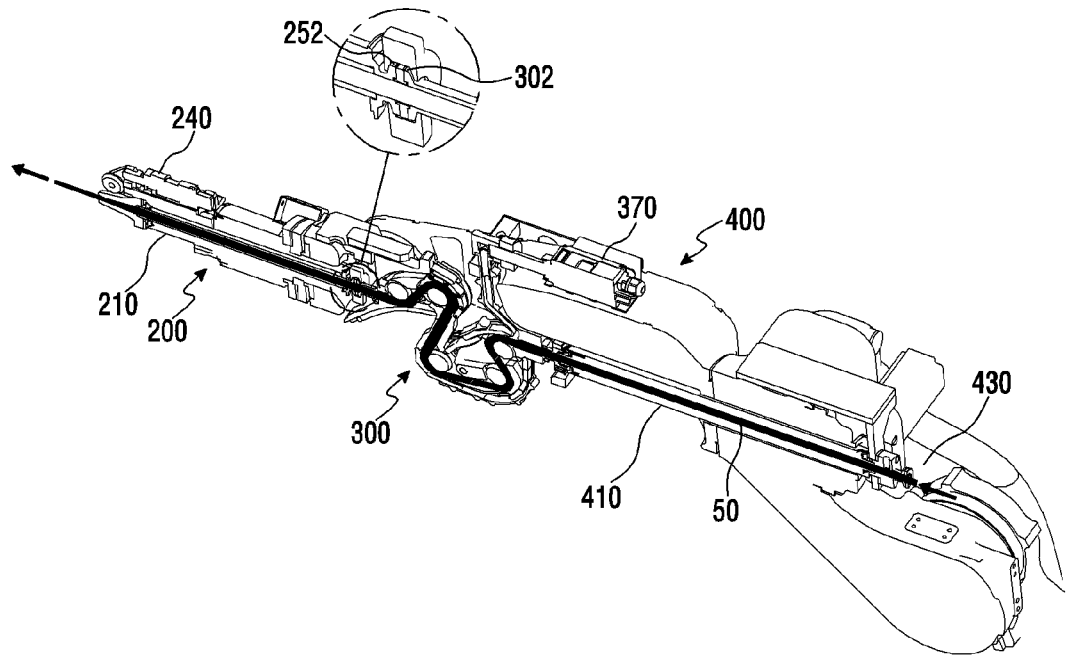
FIG. 3a is a view showing a moving path of a material in the three-dimensional product manufacturing robot 100 according to the first embodiment of the present invention.
Figure 3B:
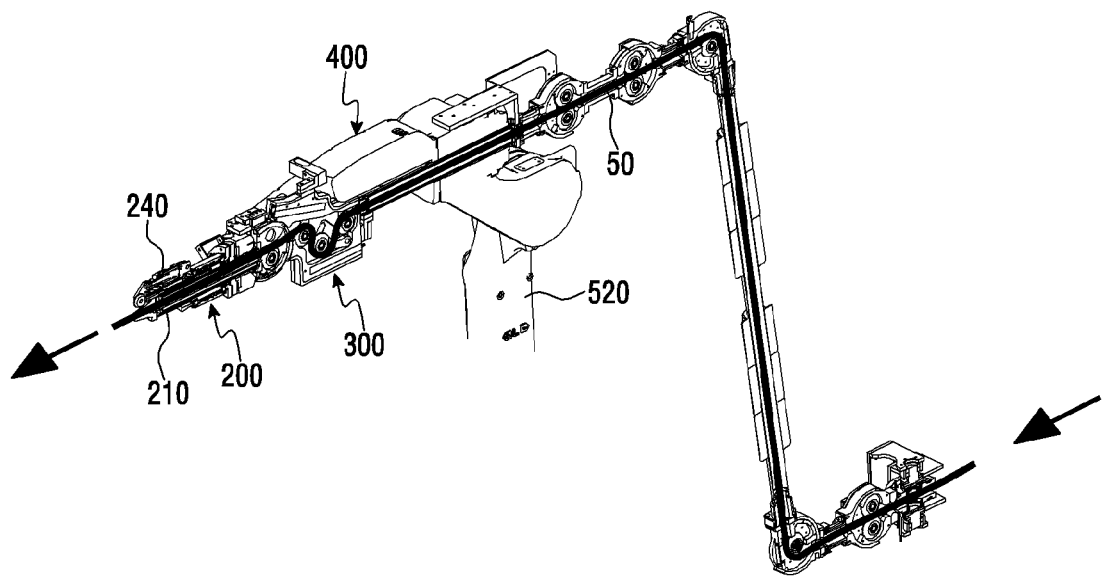
FIG. 3b is a view showing a moving path of a material in the three-dimensional product manufacturing robot 100 according to the second embodiment of the present invention.

In the three-dimensional product manufacturing robot 100 including the head unit 200 and the head supply unit 400 according to the embodiment of the present invention, the moving path of a tow 50 is, as shown in FIGS. 3a and 3b, formed by an internal passage obtained by the connection of the head unit 200, the transformer unit 300, and the head supply unit 400.

The three-dimensional product manufacturing robot 100 including the head unit 200 and the head supply unit 400 according to the embodiment of the present invention has a built-in structure including the moving path of the tow 50, which is formed within the robot 100 by the connection of the head supply unit 400, the transformer unit 300, and the head unit 200.

Here, the tow 50 refers to a continuous strand, yarn, tow, bundle, band, tape made of the polymer material or composite material. The polymer material may include thermoplastics such as PLA, PE, PP, PA, ABS, PC, PET, PEI, PEEK, etc., or thermosetting resins such as Epoxy, Unsaturated Polyester, PI, PUR etc. However, the polymer material is not limited to this. Reinforcing fibers may be Glass Fiber (GF), Carbon Fiber (CF), Aramid Fiber (AF), Natural Fiber (NF) etc. In addition, the three-dimensional product manufacturing robot can be used for textile yarn or roving.

The final composite material is obtained by mixing fiber with the polymer material. The fiber may include glass fiber, carbon fiber, boron fiber, alumina fiber, silicon carbide fiber, aramid fiber, various whiskers, or combinations of the above. However, there is no limit to this.

The manufacturing robot 100 is initially charged with yarn, tow, strand, band or tape. The individual yarn, tow, strand, band or tape is partly or fully consolidated together to a tow in an oven (containing collector, IR-heater, compactor). The head supply unit 400, transformer unit 300, head unit 200 and a lay-up roller is providing additional final consolidation and compaction of the tow.

Also, the yarn, strand, tow, band or tape, etc., has been taken as an example of the material of the finally manufactured three-dimensional product. However, for the purpose of clearly understanding the present invention, the material of the three-dimensional product will be consistently represented by the tow in the following description.

Referring back to FIGS. 3a and 3b, the moving path of the tow will be described. The tow 50 is introduced through an inlet 430 formed on the end of an inlet pipe 410 of the head supply unit 400. The inlet 430 is provided with the tow 50 from an exteriorly provided tow supplier (not shown). Also, the tow supplier (not shown) can be included within the three-dimensional product manufacturing robot 100 including the head unit 200 and the head supply unit 400 according to the embodiment of the present invention.

Also, as will be described below, the inlet 430 is connected to an exteriorly provided heater (not shown) and may be supplied with temperature controlled air. The temperature controlled air supplied through the inlet 430 ensures the tow 50 in the path reaching the inlet 430 having desired temperature and helps to prevent that the tow 50 which passes through the inside of the three-dimensional product manufacturing robot 100 including the head unit 200 and the head supply unit 400 according to the embodiment of the present invention is solidified, cured or degraded.

The tow 50 which has passed through the inlet 430 passes by the inlet pipe 410 and enters the transformer unit 300.

Here, since the head supply unit 400 includes a heater 420 inside the inlet pipe 410, the tow 50 can continue to move to the transformer unit 300 in an unsolidified, uncured or undegraded state while passing by the inlet pipe 410.

As will be described in more detail below, the transformer unit 300 includes a plurality of rollers. The plurality of rollers guide the movement of the tow 50. The tow 50 which has entered the transformer unit 300 through the head supply unit 400 changes the moving direction with a contact with each of the rollers. That is, the moving path of the tow 50 is determined by the structure or arrangement of the plurality of rollers.

Here, in the three-dimensional product manufacturing robot 100 according to the first embodiment shown in FIG. 3a, the arrangement of the plurality of rollers (Though five rollers are shown in FIG. 3a, the number of the rollers is not limited to this.) is changed while the transformer unit 300 which rotates the head unit 200 controls the movement or rotation of the head unit 200 according to the embodiment of the present invention. As a result, the moving direction of the tow 50 is changed and the tension of the tow 50 is also affected.

Here, at least one of the plurality of rollers is designed in such a way as to maintain the constant tension of the tow 50, which is changed by the movement of the tow 50. Specifically, at least one of the plurality of rollers corresponds to a tension maintaining roller for maintaining the tension of the tow 50. The remaining rollers other than the tension maintaining roller not only guide the movement of the tow but also involve the rotation of the head unit 200.

Unlike this, in the three-dimensional product manufacturing robot 100 shown in FIG. 3b according to the second embodiment, when the transformer unit 300 which rotates the head unit 200 moves or rotates the head unit 200, the arrangement of the plurality of rollers (Though four rollers are shown in FIG. 3b, the number of the rollers is not limited to this.) is not changed. However, since at least one of the plurality of rollers is a tension control roller, the constant tension of the tow 50 can be maintained.

The tow 50 which has passed through the transformer unit 300 continues to move toward the head unit 200. A coupling 302 is provided on the front end of the transformer unit 300. The coupling 302 is connected to a coupling 252 located on the head unit 200. Here, the coupling 302 of the transformer unit 300 and the coupling 252 of the head unit 200 may be directly connected to each other or may be indirectly connected to each other by means of an appropriate connection member.

The tow 50 which has entered the inside of the head unit 200 passes through a head pipe 212 of the head unit 200 and then is discharged to the outside. Here, the longitudinal and cylindrical head pipe 212 is surrounded by a head heater 214. The head heater 214 causes the head pipe 212 to maintain a controlled temperature, and thus, prevents that the tow 50 which is passing through the inside of the head pipe 212 is solidified, cured or degraded.

As described above, the three-dimensional product manufacturing robot 100 including the head unit 200 according to the embodiment of the present invention includes the plurality of heaters in order to prevent the tow 50 from being solidified, cured and degraded. However, when the tow 50 is discharged, it is necessary to properly control the temperature of the tow 50. This is to ensure an optimal discharge rate and positioning as well as to prevent the solidification and adherence to a substrate to which the tow is discharged. For the purpose of the smooth discharge of the tow 50, the head unit 200 includes a temperature regulated forced air pipe 246 for controlling the temperature of the tow 50 which is discharged to the outside. The forced air pipe 246 either directly or indirectly maintains the tow 50 at a desired temperature. The tow 50 having its temperature controlled by the forced air pipe 246 can be discharged from the unit head 200 without adhering.

The three-dimensional product manufacturing robot 100 including the head unit 200 according to the embodiment of the present invention is not limited to a particular temperature or a particular temperature range which is controlled by the heater or forced air pipe.

The controlled temperature of the tow 50 will be accepted so long as it can be interpreted as a temperature or temperature range which enables the tow 50 to be discharged without adhering and/or enables a required discharge rate.

Figure 4:
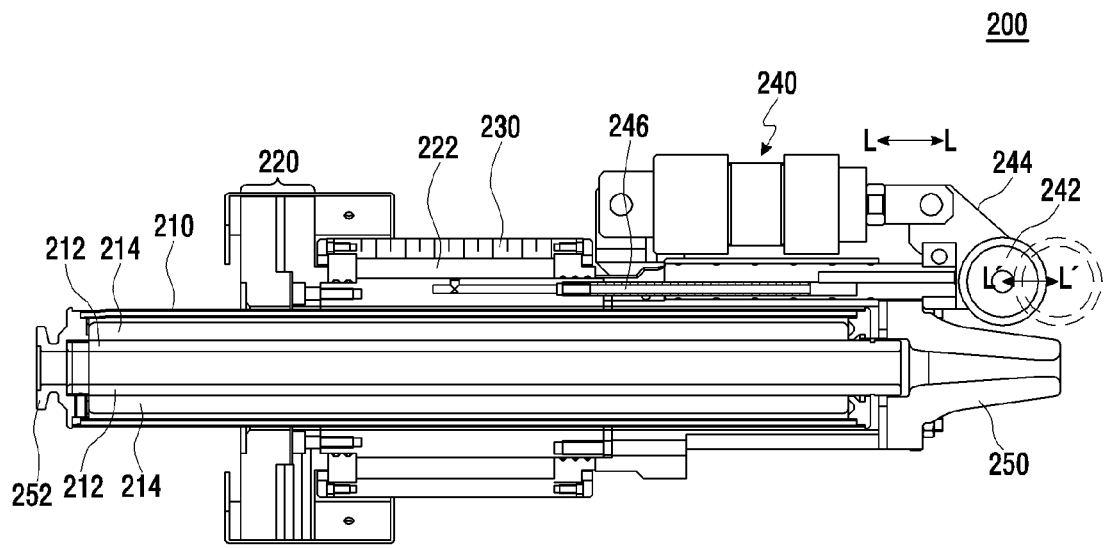
FIG. 4 is a cross sectional view of the head unit 200 which is a component of the three-dimensional product manufacturing robot 100 according to the embodiment of the present invention.

FIG. 4 is a cross sectional view of the head unit 200 according to the embodiment of the present invention. As shown in FIG. 4, the head unit 200 includes a head body 210 including the head pipe 212 and the head heater 214, a wheel assembly 220, a spacer 222, a rotary housing 230, a cylinder assembly 240, a discharge port 250, and the coupling 252. Here, the cylinder assembly 240 includes a cylinder roller 242, a cylinder roller bracket 244, and the forced air pipe 246.

The above configuration is just included in the exemplary embodiment of the present invention. So long as the above-listed configuration is able to maintain the functions of the head unit 200 according to the embodiment of the present invention, other configurations can be added, or some of the above-listed configuration can be omitted.

The head body 210 may be the longitudinal and cylindrical pipe 212. The head body 210 guides the movement of the tow 50 which has passed through the transformer unit 300 and has entered the head unit 200.

The head heater 214 surrounds the entire or partial head pipe 212 and controls the temperature of the head pipe 212, and moreover, the temperature of the tow 50 passing through the head pipe 212. That is, since the tow 50 which is passing through the head pipe 212 passes through the inside of the head pipe 212 of which the temperature has been controlled by the head heater 214, the tow 50 is smoothly discharged to the outside without being solidified, cured or degraded.

The wheel assembly 220 is provided at a predetermined position of the head body 210. Preferably, as shown in FIG. 4, the wheel assembly 220 is provided close to the end opposite to the discharge port 250 of the head unit 200.

The wheel assembly 220 allows the head body 210 to perform a multiple rotation (360°, 720° . . . ). That is, the wheel assembly 220 is comprised of a wheel, a flange, and a gasket, etc., and rotates the head body 210.

Here, internal electric wires provided within the head unit 200 may be affected by the rotation of the head body 210. In order to prevent this, the head unit 200 includes the rotary housing 230 and the spacer 222.

That is, the rotary housing 230 includes at least one spacer 222 therewithin. The wires are disposed in a space spaced by the spacer 222, so that only the head body 210 itself is rotated without being affected by the wire (twist, disconnection, etc.).

Figure 5:
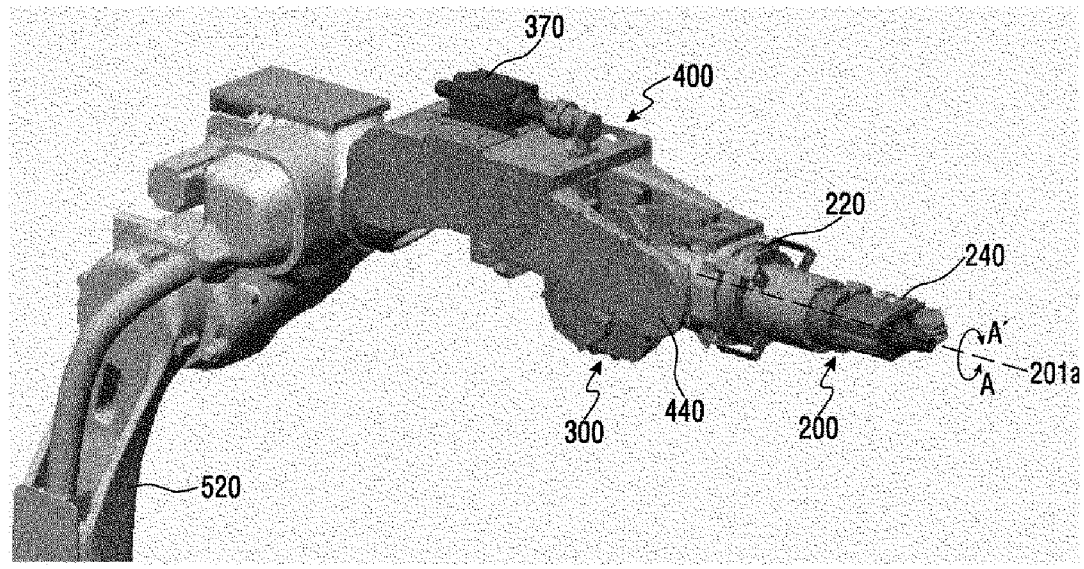
FIGS. 5 to 7 show the rotation of the head unit 200 by a wheel assembly 220.
Figure 6:
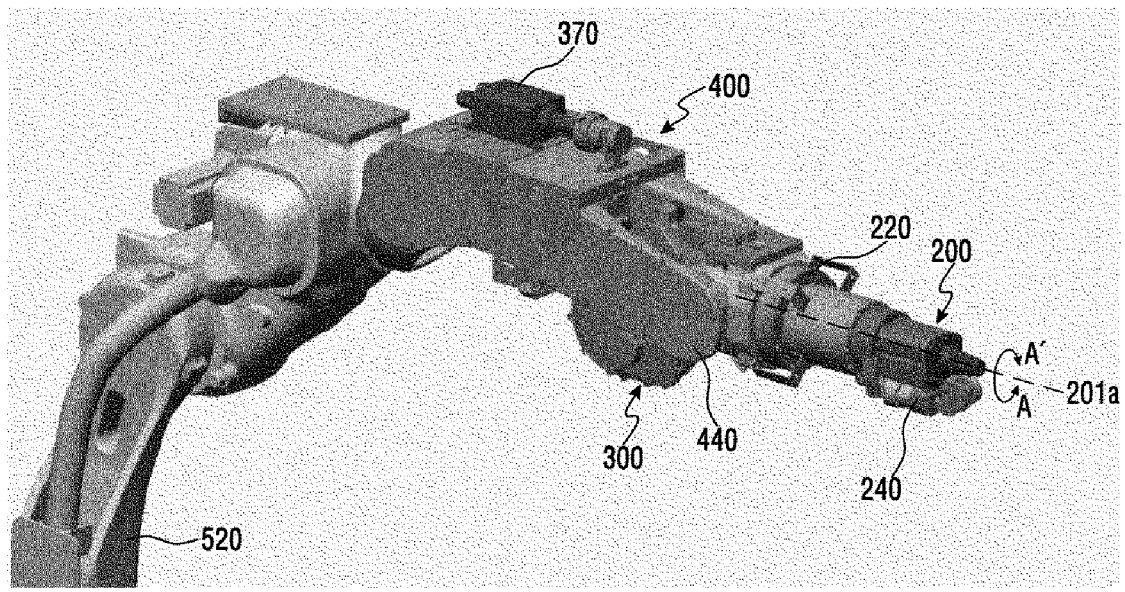
Figure 7:
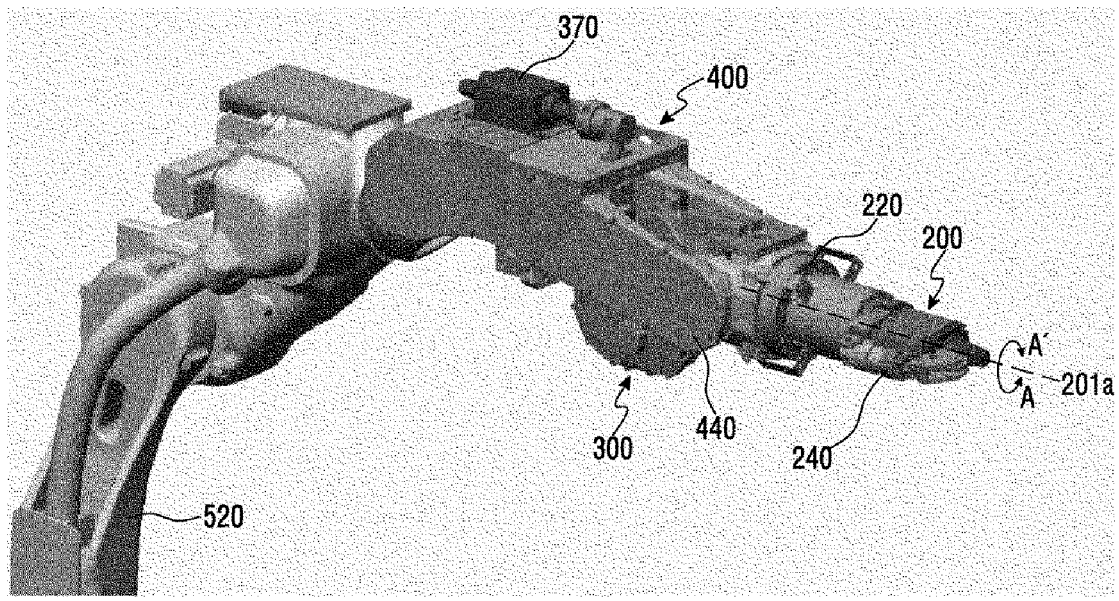

Due to the wheel assembly 220, the head unit 200 performs a rotational motion (A-A') about the longitudinal axis 201a. FIGS. 5 to 7 are views showing the rotation of the head unit 200 by the wheel assembly 220. Here, although FIGS. 5 to 7 are shown on the basis of the first embodiment-based three-dimensional product manufacturing robot 100 corresponding to FIG. 1a, the rotational motion of the head unit 200 may be made in the same manner in the second embodiment. Therefore, regarding the rotational motion (A-A') about the axis 201a of the head unit 200, the drawings and description thereof corresponding to the second embodiment will be omitted.

Referring to FIGS. 5 to 7, the head unit 200 performs a multiple rotation (360°, 720° . . . ) by itself without the help of the transformer unit 300 or head supply unit 400. As described above, due to the rotary housing 230 and the spacer 222, the internal electric wires are not affected by the rotation.

Also, the rotation of the head unit 200 does not accompany the rotation of the tow 50. That is, while the wheel assembly 220 controls the rotation of the head unit 200, the tow 50 which passes through the inside of the head unit 200 may be discharged to the outside without rotation.

As such, the rotation of the head unit 200 helps to more precisely manufacture the three-dimensional product having various shapes and structures.

The cylinder assembly 240 is fixed to a portion of the head body 210. Preferably, the cylinder assembly 240 is located adjacent to the discharge port 250 through which the tow 50 is discharged.

The cylinder assembly 240 linearly reciprocates the cylinder roller bracket 244 by using the reciprocating action of an internal piston. Accordingly, the cylinder roller bracket 244 performs a linear reciprocating action (L-L') along the longitudinal direction of the head unit 200.

Meanwhile, the cylinder roller 242 is provided on one end of the cylinder roller bracket 244. The cylinder roller 242 has a function to precisely guide the tow 50 which is discharged.

When the cylinder roller bracket 244 performs the linear reciprocating action (L-L'), the cylinder roller 242 provided on one end of the cylinder roller bracket 244 also performs the linear reciprocating action (L-L').

If the cylinder roller 242 is not provided, the tow 50 descends immediately by gravity or adheres to the discharge port 250, so that it is difficult to discharge the tow 50 to a desired position. However, when the final discharge moving path of the tow 50 is guided by the cylinder roller 242, the tow 50 can be precisely discharged to the desired position. Therefore, it is possible to manufacture the three-dimensional product having a more complicated shape by using a material made of the plastic formable materials.

Meanwhile, the cylinder assembly 240 includes the forced air pipe 246. As described above, the forced air pipe 246 decreases either directly or indirectly the temperature of the tow 50 which is discharged.

The forced air pipe 246 included in the cylinder assembly 240 controls the temperature of the components of the cylinder assembly 240, i.e., the internal piston (not shown), cylinder roller bracket 244, and cylinder roller 242. Particularly, the forced air pipe 246 controls the temperature of the cylinder roller 242 contacting with the end thereof and the temperature of the tow 50 which is guided by the cylinder roller 242. More specifically, when the cylinder roller 242 moves forward (in the moving direction of the tow 50) in accordance with the internal piston movement of the cylinder assembly 240, the final discharge direction of the tow 50 which has passed through the heat pipe 212 of the head unit 200 and has been discharged through the discharge port 250 is guided with a contact with the cylinder roller 242.

Here, the temperature of the tow 50 in contact with the cylinder roller 242 having a temperature controlled by the forced air pipe 246 is also controlled to be appropriate for the smooth discharge. Describing again, since the tow 50 which is discharged through the discharge port 250 does not free fall and the moving path of the tow 50 is guided by the cylinder roller 242, the tow 50 can be precisely discharged to the desired position and the tow 50 of which the temperature has been controlled by the forced air pipe 246 can be smoothly discharged without adhering to the discharge port 250 or cylinder roller 242.

In the next place, the transformer unit 300 controlling the rotation of the head unit 200 will be briefly described.

Figure 8A:
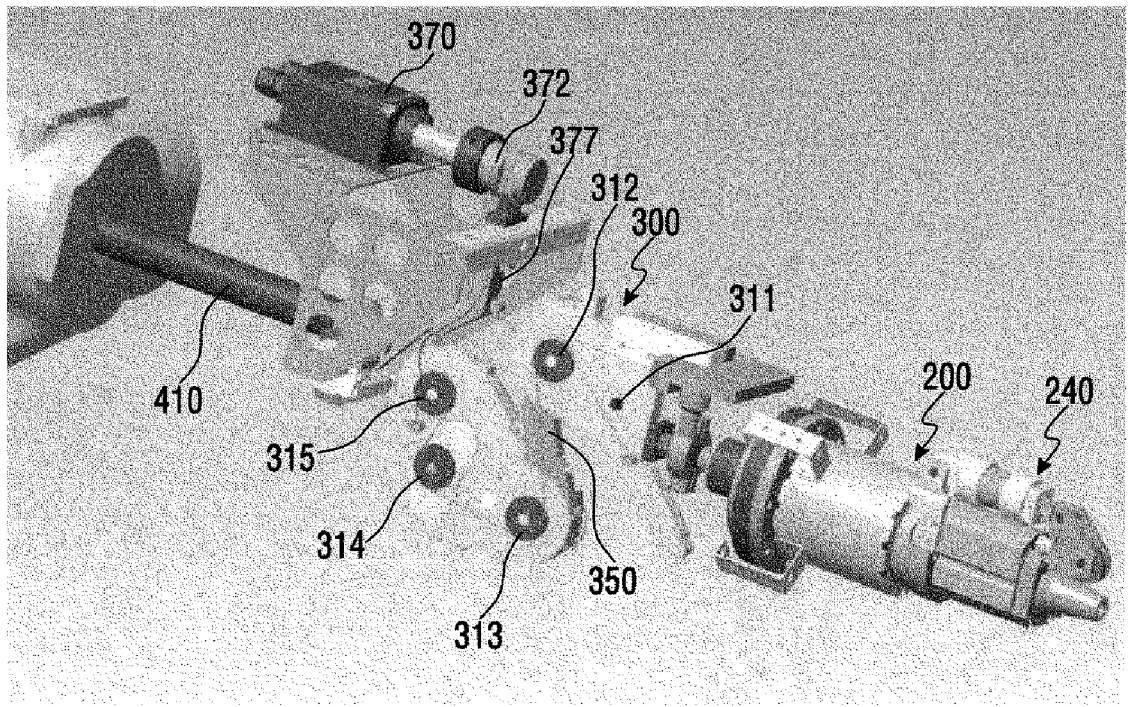
FIG. 8a is a schematic view of a transformer unit 300 which is a component of the three-dimensional product manufacturing robot 100 according to the first embodiment of the present invention.

FIG. 8a shows the configuration of the transformer unit 300 which ensures the rotation of the head unit 200 according to the embodiment of the present invention. The transformer unit 300 is included in or connected to the head supply unit 400 according to the embodiment of the present invention. As shown in FIG. 8a, the transformer unit 300 includes the plurality of rollers. It is assumed that the total of five rollers are included in the transformer unit 300 in the embodiment. However, the transformer unit 300 may include a smaller number than five of the rollers in FIG. 8a, and the transformer unit 300 may include a larger number than five of the rollers in further another embodiment.

At least two of the first to fifth rollers 311 to 315 are connected by means of a wire (not shown), so that a constant distance between the first to fifth rollers 311 to 315 is maintained. As a result, the moving path of the tow 50, which is formed in the first to fifth rollers 311 to 315, can be maintained to have a constant length.

In other words, the first to fifth rollers 311 to 315 define the moving path of the tow 50. As a constant distance between the first to fifth rollers 311 to 315 is maintained, the structural stability of the transformer unit 300 can be obtained and the length of the entire tow 50 passing through the transformer unit 300 becomes constant.

In the embodiment, the wire (not shown) is fastened to wire catching portions (not shown) provided to the second to fifth rollers 312 to 315, and thus, the length of each roller becomes constant.

Meanwhile, the shapes of a first to a sixth chains (not shown) included in the transformer unit 300 may be changed in accordance with the position changes of the first to fifth rollers 311 to 315.

In the embodiment, the relative position of the second roller 312 with respect to the first roller 311 and the relative position of the first roller 311 with respect to the second roller 312 are constant. That is, between the first roller 311 and the second roller 312, the arrangement with respect to each other (spaced distance and angle) is not changed.

Also, the relative position of the fifth roller 315 with respect to the third roller 313 and the relative position of the third roller 313 with respect to the fifth roller 315 are constant. That is, between the third roller 313 and the fifth roller 315, the arrangement with respect to each other (spaced distance and angle) is not changed.

Here, the relative position of the fourth roller 314 positioned between the third roller 313 and the fifth roller 315 is constant with respect to the third roller 313 and the fifth roller 315. However, when the fourth roller 314 operates as the tension control roller, the position of the fourth roller 314 may be variable within a predetermined range.

As a result, it can be described that the first roller 311 and the second roller 312 move as one unit, and the first to fifth rollers 313 to 315 also move as one unit. Here, the second roller 312 is connected to the third roller 313 by a connection member 350.

A portion (including the third to fifth rollers) of the transformer unit 300 rotates about the fifth roller 315, the third and fourth rollers 313 and 314 also rotate while maintaining a constant spaced distance and angle.

Therefore, the position of the second roller 312 connected to the third roller 313 by the connection member 350 is changed.

The position change of the second roller 312 accompanies the position change of the first roller 311 arranged at a constant spaced distance and at an angle.

The position changes of the first and second rollers 311 and 312 pursuant to the rotation of the fifth roller 315 causes the movement of the head unit 200. This is because the coupling 252 of the head unit 200 is connected to the coupling 302 of the transformer unit 300, and the coupling 302 of the transformer unit 300 is fixed near the first roller 311. That is, the distance and arrangement angle between the first roller 311 and the coupling 302 of the transformer unit 300 are constant.

Also, since the head unit 200 is connected to the head fastener 440 of the head supply unit 400, the head unit 200 and a portion of the transformer unit 300 (portion including the first and second rollers) perform a relative motion with respect to the connection axis 401b between the head fastener 440 and the head unit 200.

Referring to the principle of leverage, the connection axis 401b between the head fastener 440 and the head unit 200 functions as a fulcrum, the portion where the first roller 311 of the transformer unit 300 is located functions as an effort, and the head unit 200 functions as a load.

When the portion where the first roller 311 of the transformer unit 300 is located ascends, the head unit 200 descends, and when the portion where the first roller 311 of the transformer unit 300 is located descends, the head unit 200 ascends.

In other words, the head fastener 440 forms a space for receiving the transformer unit 300. The transformer unit 300 controls the movement or rotation of the head unit 200 within a length fixed by the head fastener 440.

Here, the length of the head fastener 440 is constant and the transformer unit 300 controlling the operation of the head unit 200 is located within the head fastener 440. Therefore, the transformer unit 300 according to the embodiment of the present invention is provided within a limited distance (the length of the head fastener 400) and ensures the movement of the head unit 200, so that the three-dimensional product manufacturing robot 100 can have a more compact configuration.

Hereafter, the detailed configuration of the transformer unit 300 will be described according to the second embodiment of the present invention. As with the first embodiment, the transformer unit 3 shown in FIG. 8b includes the plurality of rollers. It is assumed that the total of four rollers is included in the transformer unit 300 in the second embodiment. However, the transformer unit 300 may include a smaller number than four of the rollers in another embodiment, and the transformer unit 300 may include a larger number than four of the rollers in further another embodiment.

The positions of at least two of the first to fourth rollers 381 to 384 are fixed. As a result, the moving path of the tow 50, which is formed in the first to fourth rollers 381 to 384, can be maintained to have a constant length.

In other words, the first to fourth rollers 381 to 384 define the moving path of the tow 50. As a constant distance between the first to fourth rollers 381 to 384 is maintained, the structural stability of the transformer unit 300 can be obtained and the length of the entire tow 50 passing through the transformer unit 300 becomes constant.

Particularly, as with the first embodiment described above, due to a wire (not shown) fastened to a wire catching portion (not shown), positions of the rollers may be fixed to one sides of the first to fourth rollers 381 to 384 respectively, and a distance or length between the rollers may be maintained constant.

In the embodiment, the relative position (spaced distance or relative angle) of the rollers 381 to 384 with respect to each other is constant.

Here, the first roller 381 may be located adjacent to a connection area 389 where the head unit 200 and the head fastener 440 of the head supply unit 400 are connected. The head unit 200 is mounted on the connection area 389 and may rotate about the rotational axis 401b (see FIG. 1b) in a direction of B-B'.

At least one of the first to fourth rollers 381 to 384 functions as a tension control roller which adaptively controls the tension of the tow 50 passing through the transformer unit 300.

Figure 8B:
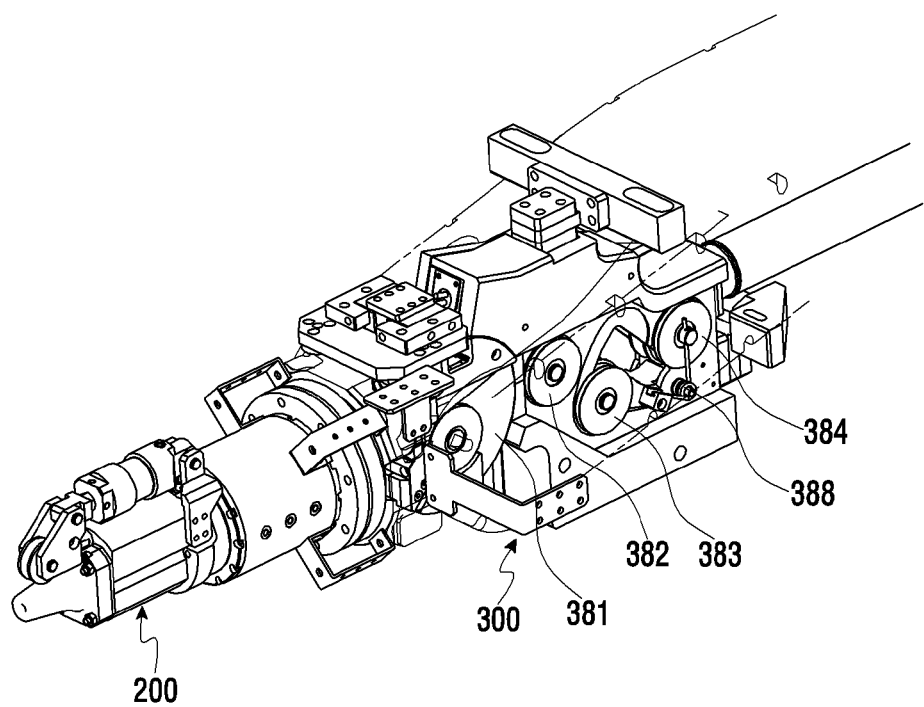
FIG. 8b is a schematic view of a transformer unit 300 which is a component of the three-dimensional product manufacturing robot 100 according to the second embodiment of the present invention.

FIG. 8b show that the third roller 383 has a function of adaptively controlling the tension of the tow 50. However, it can be considered that other rollers except the third roller 383 perform such a function, or a separate tension control roller is provided.

As described above, each of the rollers 381 to 384 provided on the transformer unit 300 defines the moving path of the tow 50. Referring to FIG. 3b, the tow 50 enters the transformer unit 300 and is guided by the first to fourth rollers 381 to 384, and then moves toward the head unit 200.

That is, the tow 50 changes the moving direction with a contact with a portion of the circumferential surface of each of the first to fourth rollers 381 to 384, and thus, proceeds to the head unit 200.

Here, the tension of the tow 50 passing through the first to fourth rollers 381 to 384 may be changed (increased or decreased).

For the purpose of preventing this, the third roller 383, i.e., the tension control roller having a function of controlling the tension of the tow 50 may include an elastic member 388. Due to the elastic member 388, the third roller 383 can be moved within a predetermined distance.

As shown in FIG. 8b, one end of the elastic member 388 is connected to the center of the third roller 383, i.e., the adaptive tension control roller. The other end of the elastic member 388 is fixed to the inside of the transformer unit 300. In FIG. 8b, although the other end of the elastic member 388 is fixed to the center of the fourth roller 384, the other end of the elastic member 388 may be fixed to another area.

The position of the third roller 383 is moved within the predetermined distance in response to the tension change of the tow 50, which occurs by the passing of the tow 50 through the transformer unit 300, so that the constant tension of the tow 50 is maintained.

As such, when the moving path of the tow 50 is formed by the first to fourth rollers 381 to 384 including the third roller 383, i.e., the adaptive tension control roller, the constant tension of the tow 50 can be controlled in response to the tension change of the tow 50.

In the embodiment, the elastic member 388 has been mentioned as a means making it possible to move the position of the third roller 383, i.e., the adaptive tension control roller. However, other means except the elastic member 388 can be provided.

Meanwhile, the internal components of the transformer unit 300 can be isolated and protected from the outside by a cover.

Figure 9:
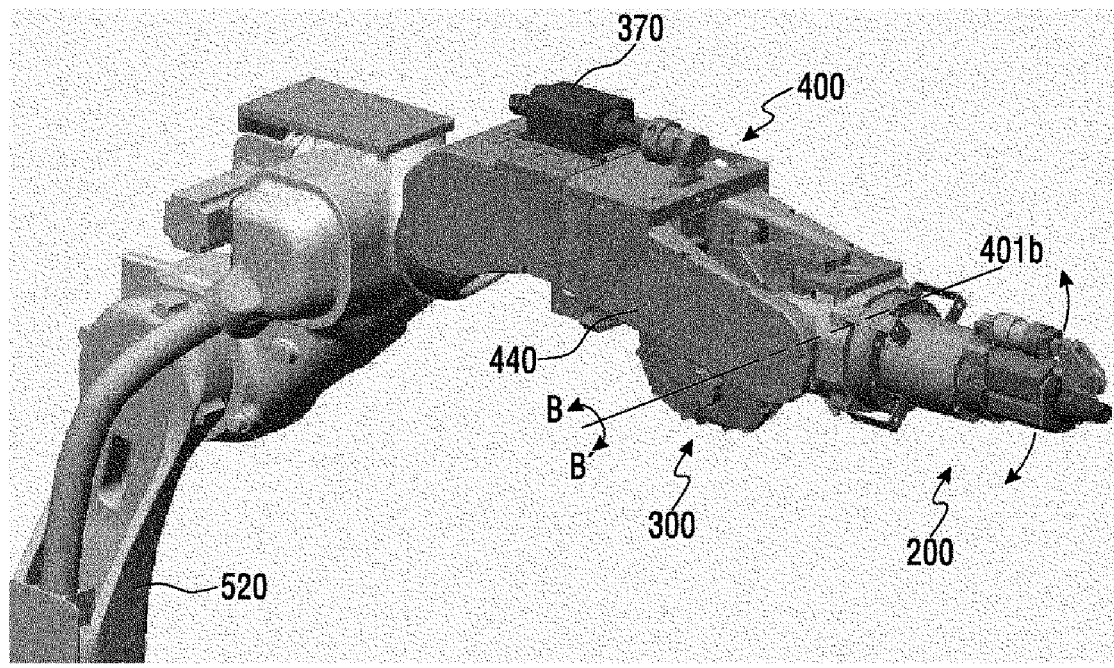
FIGS. 9 to 11 are views showing the rotation or movement of the head unit 200 according to the first embodiment of the present invention.
Figure 10:
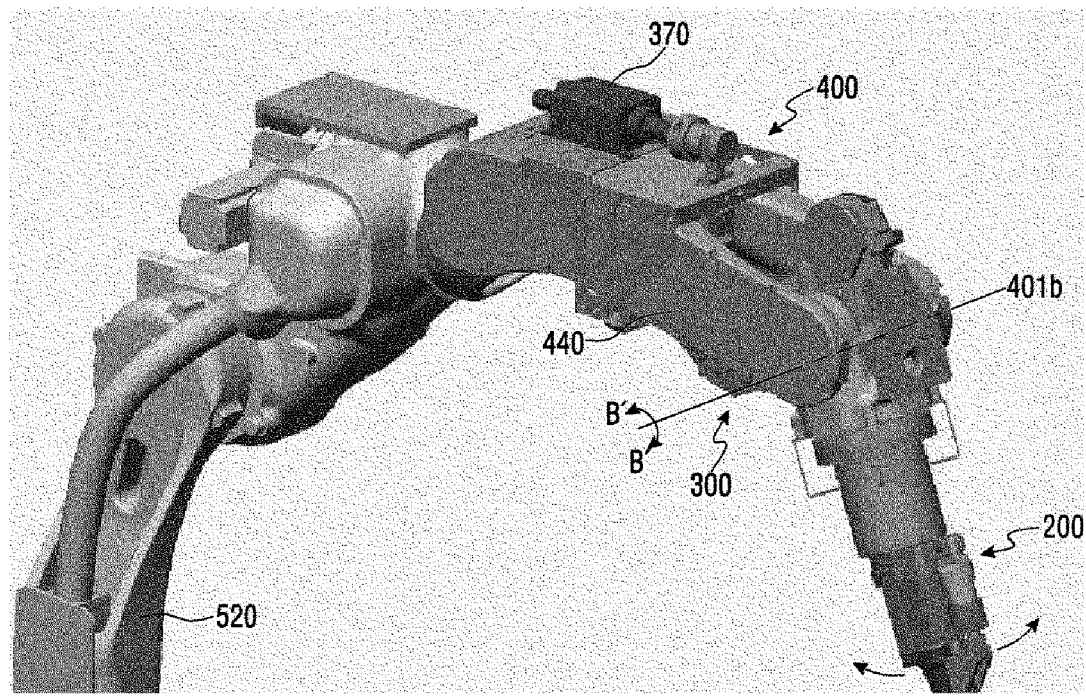
Figure 11:
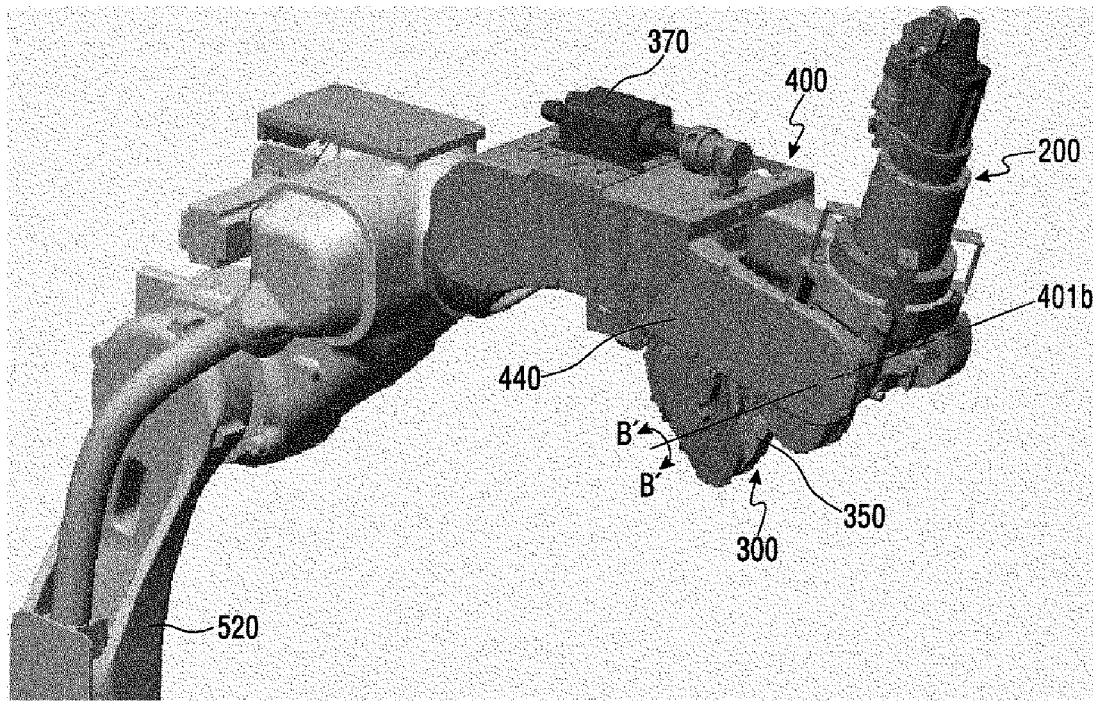

FIGS. 9 to 11 are views showing the rotation or movement of the head unit 200 according to the first embodiment of the present invention.

FIG. 9 shows that the configuration of the transformer unit 300 has been placed at the positions shown in FIG. 8a. Here, the head unit 200 is placed on an extension line in a direction almost parallel with a horizontal plane, that is, in the longitudinal direction of the head supply unit 400.

Here, FIG. 10 shows that the portion where the third to fifth rollers 313 to 315 of the transformer unit 300 are provided has descended about the fifth roller 315. FIG. 11 shows that the portion where the third to fifth rollers 313 to 315 of the transformer unit 300 are provided has ascended about the fifth roller 315. As shown in FIG. 8, since the third to fifth rollers 313 to 315 are included in the same member, the third to fifth rollers 313 to 315 can move as one unit. Also, since the first and second rollers 311 and 312 are included in the same member, the first and second rollers 311 and 312 can move as one unit.

Besides, the second roller 312 and the third roller 313 are connected to each other by the connection member 350. Therefore, when the fifth roller 315 rotates, all of the rollers can move in associated with each other.

FIG. 10 shows that a portion of the transformer unit 300, which includes the fifth roller 315, (a portion where the third to fifth rollers are included) rotates about the fifth roller 315.

The rotation of the portion of the transformer unit 300 (the portion where the third to fifth rollers are included) about the fifth roller 315 causes the connection member 350 which connects the third roller 313 with the second roller 312 to ascend, so that another portion of the transformer unit 300 (a portion where the first and second rollers are included) is moved. When the another portion (the portion where the first and second rollers are included) ascends, the head unit 200 connected to the another portion is caused to move or rotate. Specifically, the head unit 200 opposite to the another portion with respect to the connection axis 401b descends.

FIG. 11 shows that a portion of the transformer unit 300, which includes the fifth roller 315, (the portion where the third to fifth rollers are included) rotates in an opposite direction to that of FIG. 10.

The rotation of the portion of the transformer unit 300 (the portion where the third to fifth rollers are included) about the fifth roller 315 causes the connection member 350 which connects the third roller 313 with the second roller 312 to descend, so that another portion of the transformer unit 300 (a portion where the first and second rollers are included) is moved. When the another portion (the portion where the first and second rollers are included) descends, the head unit 200 connected to the another portion is caused to move or rotate. Specifically, the head unit 200 opposite to the another portion with respect to the connection axis 401b ascends.

As such, since the transformer unit 300 can be transformed in a limited space (within a limited length range by the head fastener 440) by using the plurality of rollers 311 to 315, it can rotate the head unit 200. Therefore, the three-dimensional product manufacturing robot 100 can have a more compact configuration.

Lastly, the rotation and movement of the head unit 200 according to the second embodiment will be described with reference to FIGS. 12 to 13.

Figure 12:
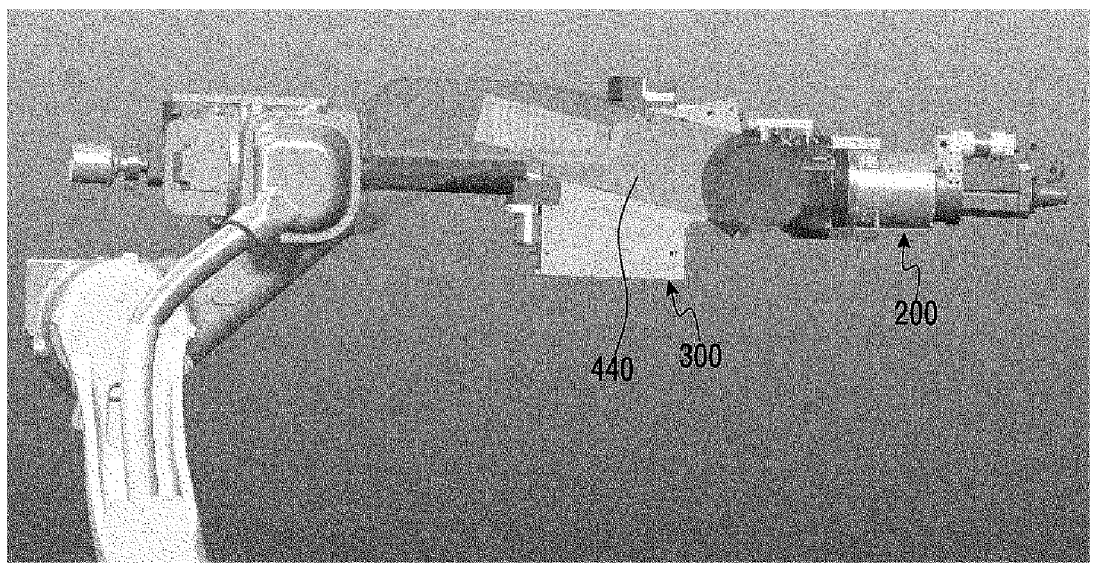
FIGS. 12 and 13 are views showing the rotation or movement of the head unit 200 according to the second embodiment of the present invention.
Figure 13:
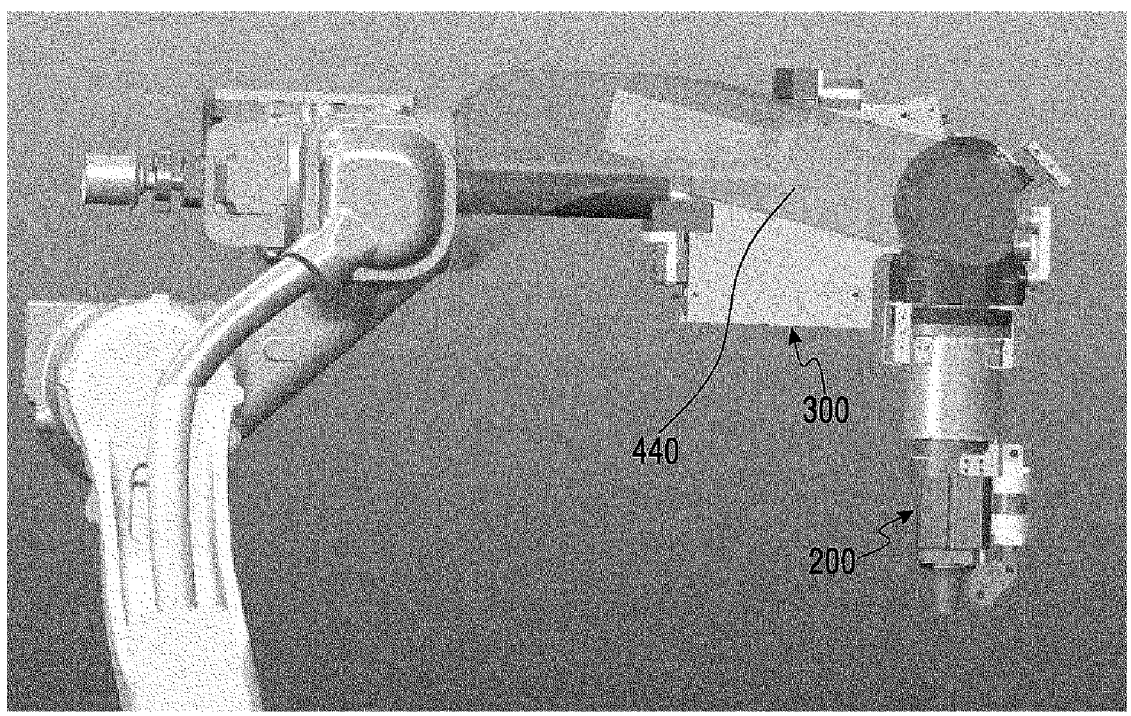

FIG. 12 shows that the head unit 200 is placed on an extension line in a direction almost parallel with a horizontal plane, that is, in the longitudinal direction of the head supply unit 400. Unlike the first embodiment, the rotation of the head unit 200 does not affect each of the rollers 381 to 384 provided on the transformer unit 300 in the second embodiment. FIG. 13 shows that the head unit 200 descends downwardly. As shown in FIGS. 12 and 13, in the second embodiment, the head unit 200 is rotatably fixed by the head fastener 440, and the interconnection of the head unit 200 and the transformer unit 300 intends to form the moving path of the tow 50.

Through use of the plurality of rollers 381 to 384, the transformer unit 300 maintains the constant tension of the tow 50, and the head unit 200 is connected to the head fastener 440 and becomes easily rotatable.

While the present invention has been described from the viewpoint of the specific embodiment including the exemplary embodiment of the present invention, it can be understood by those skilled in the art that various substitutions and modifications can be made in the above-described configuration of the present invention. Also, structural and functional changes can be variously made without departing from the scope and spirit of the present invention. Therefore, the scope and spirit of the present invention should be construed broadly as described in the claims of the present specification.

What is claimed is:

1. A head supply unit comprising:
   an inlet through which a raw material made of plastic formable materials is introduced;
   an inlet pipe which guides the raw material introduced through the inlet;
   a head supply heater which controls the temperature of the raw material which passes through the inside of the inlet pipe; and
   a head fastener which is fastened to a head unit which discharges the raw material,
   wherein one end of the inlet pipe is connected to a transformer unit comprising a plurality of rollers which define a moving path of the raw material,
   wherein the head fastener forms a receiving space in which the transformer unit is installed, and
   wherein the transformer unit is installed in the receiving space and moves or rotates the head unit with respect to a connection axis between the head fastener and the head unit.

2. The head supply unit of claim 1, wherein the inlet is connected to an air heater which supplies air of a predetermined temperature.

* * * * *